US011030695B2

(12) United States Patent
Daly

(10) Patent No.: US 11,030,695 B2
(45) Date of Patent: *Jun. 8, 2021

(54) METHOD AND SYSTEM RELATING TO SOCIAL MEDIA TECHNOLOGIES CONFIGURED FOR PERMISSIONED ACTIVITIES ON A NETWORK PLATFORM HOSTING SHAREHOLDER FORUM AND MEETINGS

(71) Applicant: Broadridge Financial Solutions, Inc., Jersey City, NJ (US)

(72) Inventor: Richard J. Daly, Upper Brookville, NY (US)

(73) Assignee: Broadridge Financial Solutions, Inc., Newark, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/700,048

(22) Filed: Dec. 2, 2019

(65) Prior Publication Data

US 2020/0104936 A1 Apr. 2, 2020

Related U.S. Application Data

(63) Continuation of application No. 16/263,506, filed on Jan. 31, 2019, now Pat. No. 10,497,062, which is a
(Continued)

(51) Int. Cl.
*G06Q 40/04* (2012.01)
*G06Q 40/06* (2012.01)
*G06Q 50/00* (2012.01)

(52) U.S. Cl.
CPC ............ *G06Q 40/06* (2013.01); *G06Q 40/04* (2013.01); *G06Q 50/01* (2013.01)

(58) Field of Classification Search
CPC ......... G06Q 40/00; G06Q 40/04; G06Q 50/01
See application file for complete search history.

(56) References Cited

U.S. PATENT DOCUMENTS

| 7,882,006 B2* | 2/2011 | Gardner | G06Q 40/00 705/36 R |
|---|---|---|---|
| 2002/0082907 A1* | 6/2002 | Inomata | G06Q 10/06 705/12 |

(Continued)

OTHER PUBLICATIONS

Daly, Richard J.; New technologies for new engagement benefits offer are greater opportunities for shareholders to participate in the annual meeting, higher levels of voting participation, more transparency, and lower costs, Oct. 31, 2011, Gal Group Trade& Industry; web, 1-3 (Year: 2011).*

*Primary Examiner* — I Jung Liu
(74) *Attorney, Agent, or Firm* — Greenberg Traurig, LLP

(57) ABSTRACT

In an embodiment, a method performed in the computing system comprises steps of (a) electronically receiving an identifier concerning an investor's ownership or management of at least one brokerage account or at least one security; (b) electronically validating by the computing system the investor by querying a record database using the identifier to obtain an information from at least one investment account associated with the investor; (c) electronically extracting by the computing system the information; (d) electronically populating by the computing system a profile for the investor with the extracted information and electronically storing the extracted information to a computer readable medium in a profile database, wherein the extracted information comprises at least the investor's positional information; (e) electronically providing by the computing system at least one capability to the investor, wherein the capability allows the investor to electronically perform one or more activities; and (f) electronically generating by the
(Continued)

computing system a representation of a quantity of a security owned or managed by the investor from the investor's positional information without generating a personal information of the investor.

16 Claims, 11 Drawing Sheets

Related U.S. Application Data continuation of application No. 16/042,239, filed on Jul. 23, 2018, now abandoned, which is a continuation of application No. 14/962,305, filed on Dec. 8, 2015, now abandoned, which is a continuation of application No. 14/695,900, filed on Apr. 24, 2015, now abandoned, which is a continuation of application No. 13/757,230, filed on Feb. 1, 2013, now abandoned, which is a continuation of application No. 12/567,506, filed on Sep. 25, 2009, now Pat. No. 8,370,244.

(60) Provisional application No. 61/100,177, filed on Sep. 25, 2008.

(56) References Cited

U.S. PATENT DOCUMENTS

| 2006/0218179 A1* | 9/2006 | Gardner | G06Q 40/00 |
| 2007/0219886 A1* | 9/2007 | Cooke | G06Q 40/06 |
| | | | 705/35 |

* cited by examiner

METHOD AND SYSTEM RELATING TO SOCIAL MEDIA TECHNOLOGIES CONFIGURED FOR PERMISSIONED ACTIVITIES ON A NETWORK PLATFORM HOSTING SHAREHOLDER FORUM AND MEETINGS

CROSS-REFERENCE TO RELATED APPLICATIONS

This application is a continuation of U.S. patent application Ser. No. 14/962,305, filed Dec. 8, 2015, which is a continuation of U.S. patent application Ser. No. 14/695,900, filed Apr. 24, 2015, which is a continuation of U.S. patent application Ser. No. 13/757,230, filed Feb. 1, 2013, which is a continuation of U.S. patent application Ser. No. 12/567,506, filed Sep. 25, 2009, now U.S. Pat. No. 8,370,244, which claims priority to and the benefit of U.S. Provisional Patent Application No. 61/100,177, filed Sep. 25, 2008, the entirety of which are incorporated herein by reference.

BACKGROUND OF THE INVENTION

This invention relates to a method and system concerning computer related social media technologies for financial market participants, such as retail investors, institutional investors, and issuers, i.e. institutions, such as public companies, that issue publicly available financial instruments, such as shares.

BRIEF SUMMARY OF THE INVENTION

This invention provides the financial market participants with a computing system, The Investor Network, that facilitates communication exchange and dissemination of information among these market participants.

In an embodiment, a method performed in the computing system comprises steps of (a) electronically receiving an identifier concerning an investor's ownership or management of at least one brokerage account or at least one security; (b) electronically validating by the computing system the investor by querying a record database using the identifier to obtain an information from at least one investment account associated with the investor; (c) electronically extracting by the computing system the information; (d) electronically populating by the computing system a profile for the investor in The Investor Network with the extracted information and electronically storing the extracted information to a computer readable medium in a profile database of The Investor Network, wherein the extracted information comprises at least the investor's positional information; (e) electronically providing by the computing system at least one capability to the investor, wherein the capability allows the investor to electronically perform one or more activities in The Investor Network; and (f) electronically generating by the computing system in The Investor Network a representation of a quantity of a security owned or managed by the investor from the investor's positional information without generating a personal information of the investor. In an embodiment, after step (f) of the method in accordance with the invention, electronically and necessarily displaying, by the computer system, the generated representation of the quantity of the security. In another embodiment, in accordance with the method of the invention, electronically preventing the investor from altering or deleting the displayed representation of the quantity of the security.

In an embodiment, the representation of a quantity of a security is a number range that includes the number of shares owned or managed. In an embodiment, the representation of a quantity of a security is a monetary value of a quantity of a security owned or managed.

In embodiments, the computing system electronically and periodically updates the investor's profile. In embodiments, the participation in a Shareholder Forum may be restricted to only validated shareholders of a company. In embodiments, the Shareholder Forum is typically originated by a sponsoring issuer. In embodiments, the identifier can be proxy control number or other information from the investor's profile. In embodiments, the investor's profile further comprises an investor type identifier. In embodiments, at least one capability is provided based on a value of the investor type identifier in the investor's profile. In embodiments, the access to certain content of The Investor Network is restricted based on a value of the investor type identifier. In embodiments, the computing system updates the investor's profile before the investor is allowed to perform at least one activity. In embodiments, certain investor's activities may be electronically stored in a database. In embodiments, the information from the profile database and the activity database is aggregated.

In an embodiment, a programmed computer comprises a memory having at least one region for storing computer executable program code; and a processor for executing the program code stored in the memory, wherein the program code comprises: (a) code to electronically receive an identifier concerning an investor's ownership or management of at least one brokerage account or at least one security; (b) code to validate the investor by querying a record database using the identifier to obtain an information from at least one investment account associated with the investor; (c) code to extract the information; (d) code to populate a profile for the investor in The Investor Network with the extracted information and store the extracted information to a computer readable medium in a profile database of The Investor Network, wherein the extracted information comprises at least the investor's positional information; (e) code to provide at least one capability to the investor, wherein the capability allows the investor to electronically perform one or more activities in The Investor Network; and (f) code to generate a representation of a quantity of a security owned or managed by the investor from the investor's positional information without generating a personal information of the investor.

In embodiments, a computer readable medium is encoded with computer readable program code, including subroutines for (a) electronically receiving an identifier concerning an investor's ownership or management of at least one brokerage account or at least one security; (b) electronically validating by the computing system the investor by querying a record database using the identifier to obtain an information from at least one investment account associated with the investor; (c) electronically extracting by the computing system the information; (d) electronically populating by the computing system a profile for the investor in The Investor Network with the extracted information and electronically storing the extracted information to a computer readable medium in a profile database of The Investor Network, wherein the extracted information comprises at least the investor's positional information; (e) electronically providing by the computing system at least one capability to the investor, wherein the capability allows the investor to electronically perform one or more activities in The Investor Network; and (f) electronically generating by the computing system in The Investor Network a representation of a quantity of a security owned or managed by the investor from the investor's positional information without generating a personal information of the investor. In embodiments, the first, second, third, and fourth computers is one or more programmed computers. In embodiments, the one or more programmed computers are distributed over several physical locations.

BRIEF DESCRIPTION OF THE SEVERAL VIEWS OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

FIG. 4 illustrates an embodiment of the present invention.

FIG. 5 illustrates another embodiment of the present invention.

DETAILED DESCRIPTION OF THE INVENTION

Figure 1:
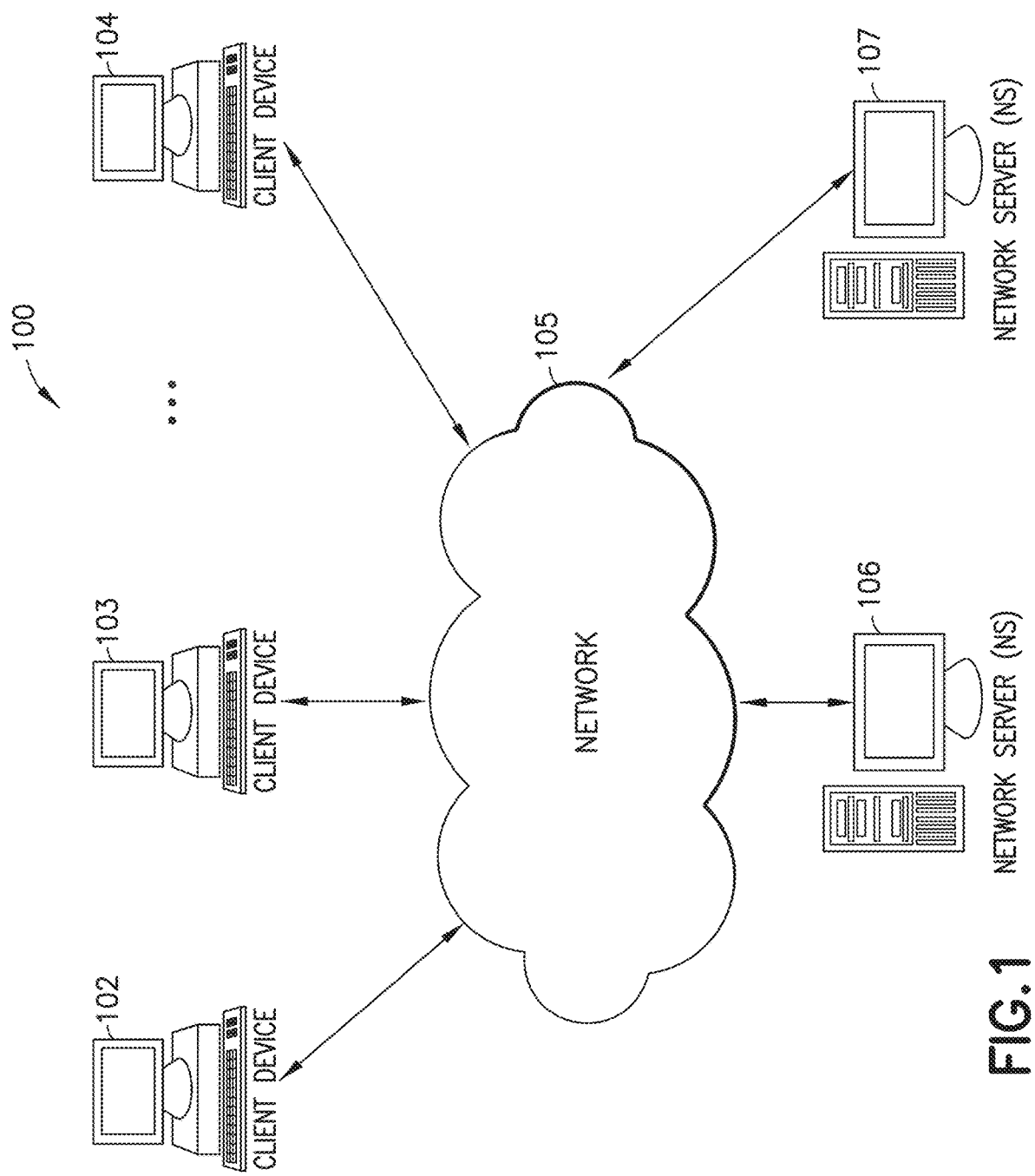
FIG. 1 illustrates one embodiment of an environment in which the present invention may operate.

Detailed embodiments of the present invention are disclosed herein; however, it is to be understood that the disclosed embodiments are merely illustrative of the invention that is embodied in various forms. In addition, each of the examples given in connection with the various embodiments of the invention are intended to be illustrative, and not restrictive. Further, the figures are not necessarily to scale, some features is exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Definitions

Financial market participants—any party involved in transactions concerning an investment instrument. This includes corporations, mutual fund companies, custodians, financial institutions—e.g. brokerages, hedge funds, other money management institution, and banks,—shareholders, bondholders, transfer agents, solicitors, proxy agents, voting agents, proxy advisors, and any other interested party.

An investment instrument or a security—a fungible, negotiable instrument representing financial value and used as means to acquire equity capital or loan capital. Securities are broadly categorized into debt securities (such as banknotes, promissory notes, bonds and debentures); equity securities, e.g., common stocks; and derivative contracts, such as forwards, futures, options and swaps.

An investor—a person or an entity that owns, manages, possesses and/or controls an investment instrument. The investor has at least one investment account at a financial institution and/or owns at least one security.

Retail Investor—an individual investor possessing shares of a given security. Retail investors are typically either beneficial shareholders or registered shareholders. Professional/Institutional Investor—an investor, such as a bank, insurance company, public/private pension plan, retirement fund, hedge fund, or mutual fund, that is financially sophisticated and makes large investments, often held in very large portfolios of investments. Because of their sophistication, institutional investors may often participate in private placements of securities, in which certain aspects of the securities laws may be inapplicable. The professional investors may get paid for their ability to manage retail investors or organization's investment. For example, in embodiments, professional investors may include buy side portfolio managers and hedge fund managers.

Beneficial Shareholder—a retail investor who holds shares of their securities in the account of a bank or broker, also known as "in Street Name." The broker is in possession of the securities on behalf of the underlying shareholder.

Registered Shareholder—an investor who holds shares of their securities directly through the issuer or its transfer agent.

Issuers—Publicly-traded corporations and mutual fund companies.

Investor Account—an account from which an investor can buy or sell at least one security.

Positional Information—a quantity of a security owned and/or managed by an the investor.

Personal Information—information about a person that comprises a person's name, address, telephone, social security number and/or any other similar information.

Computing System—a computer system that includes one or more programmed computers; or a system that employs distributing networking; or other type of system that might be used.

Electronic/Web/Internet content—in general we view data, applications, E-Services, images (graphics), audio and video files, personal Web pages, archived e-mail messages, and many more forms of file and data systems as belonging to websites and web pages.

Electronic Communication—each and every electronic means of communication concerning the impact of securities, and exchanged between the financial market participants regarding the value, actions, and results of a corporate action and any corporate issuer and/or any of its subsidiaries, contractors, and/or interested parties that may have interest in the securities of such corporation or mutual fund company. Thus, "electronic communication" includes each and every message exchanged or sent among the financial market participants or posted by the financial market participants to a common attended website on the Internet.

Electronic/Computer-related Social Media technologies—the Internet's technologies that allow an Internet user to create an or manipulate online content. Social media technologies may include, for example: blogs, picture-sharing, vlogs, wall-postings, email, instant messaging, music-sharing, crowd sourcing, and voice over IP.

Social media/Online Content—the Internet's content that can take many different forms, including Internet forums, weblogs, social blogs, wikis, podcasts, pictures and video.

Social Network Service—a service that focuses on building online communities of people who share interests and/or activities, or who are interested in exploring the interests and activities of others. Most social network services are web based and provide a variety of ways for users to interact. The social network service may operate in a manner in which a social network's members serve dual roles as both the suppliers and the consumers of content or in another manner in which the suppliers and consumers of content are distinct agents. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Linkedin.com and Facebook.com.

The Investor Network—an investment-oriented social networking site in accordance with embodiments of this invention.

Internet Forum, or message board—an online discussion website or a discussion section of a website, which is supported by web applications managing user-generated content, for example posts, blogs, and like.

A Shareholder Forum—a place on The Investor Network, may be in a form of an Internet forum, which concerns shareholders of a particular security and may or may not be sponsored by an issuer.

Post—a user submitted message enclosed into a block which may contain the user's details and the date and time it was submitted. Posts are often contained in threads, where they appear as boxes one after another. The first post starts the thread; this may be called the original post, or OP. Posts that follow in the thread are meant to continue discussion about that post, or respond to other replies.

Chat Room—any form of synchronous conferencing or asynchronous conferencing. The term can thus mean any technology ranging from real-time online chat over instant messaging and online forums to fully immersive graphical social environments.

Capability—an entitlement to perform a certain activity within The Investor Network.

Permission—a degree to which a member can utilize a particular capability. The application permissions are used to configure how visitors will access the forums and other features of the software.

Web 2.0 is web development and web design that facilitates interactive information sharing, interoperability, user-centered design[1] and collaboration on the World Wide Web. Examples of Web 2.0 include web-based communities, hosted services, web applications, social-networking sites, video-sharing sites, wikis, blogs, mashups and folksonomies. A Web 2.0 site allows its users to interact with other users or to change website content, in contrast to non-interactive websites where users are limited to the passive viewing of information that is provided to them.

Illustrative Operating Environment

FIG. 1 illustrates one embodiment of an environment in which the present invention operates. However, not all of these components are required to practice the invention, and variations in the arrangement and type of the components can be made without departing from the spirit or scope of the invention. In some embodiment, The Investor Network hosts a large number of members and concurrent transactions. In other embodiments, The Investor Network is based on a scalable computer and network architecture that incorporates varies strategies for assessing the data, caching, searching, and database connection pooling. An example of the scalable architecture is an architecture that is capable of operating multiple servers.

As shown in FIG. 1, the system 100 includes client devices 102-104, network 105, and network servers (NS) 106 and 107. Network 105 is in communication with and enables communication between each of client devices 102-104, and NSs 106 and 107.

In embodiments, client devices 102-104 include virtually any computing device capable of receiving and sending a message over a network, such as network 105, to and from another computing device, such as NSs 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each client device within client devices 102-104 includes a browser application that is configured to receive and to send web pages, emails, and the like. In embodiments, the browser application is configured to receive and display graphics, text, multimedia, and the like, employing virtually any web based language, including, but not limited to HyperText Markup Language (HTML), JavaScript, Cascading Style Sheets, Flash, and the like. In embodiments, The Investor Network may be programmed in .Net.

In embodiments, client devices 102-104 are be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, client devices 102-104 are further configured to enable a user to manage a user profile, category information, activity participation, and the like, which may in turn be saved at a remote location, such as NSs 106 and 107, and the like. As such, in embodiments, client devices 102-104 further include a client application that is configured to manage various actions on behalf of the client device. For example, in embodiments, the client application enables a user to interact with the browser application, email application, and the like, to customize how another investor network user might view a persona, profile, or the like associated with the user. For example, in embodiments, the user employs the client application, in part, to provide one customized view for his or her investment portfolio, another customized view for a group of like members of The Investor Network with whom he or she communicates, yet another view for other participants of The Investor Network and/or activities provided by The Investor Network.

In embodiments, network 105 is configured to couple one computing device to another computing device to enable them to communicate. In embodiments, network 105 is enabled to employ any form of computer readable media for communicating information from one electronic device to another. Also, in embodiments, network 105 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router acts as a link between LANs, enabling messages to be sent from one to another. Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in embodiments, remote computers and other related electronic devices could be remotely connected to either LANs or WANs via a modem and temporary telephone link. In essence, in embodiments, network 105 includes any communication method by which information may travel between client devices 102-104, and NSs 106 and 107.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of NSs 106 and 107 are described in more detail below in conjunction with FIG. 2. Briefly, in embodiments, however, INSs 106 and 107 include any computing device capable of connecting to NETWORK 105 to manage a customization of a view associated with The Investor Network user, such as a user of at least one of client devices 102-104. In embodiments, devices that may operate as NSs 106 and 107 include multiprocessor systems, microprocessor-based or programmable consumer electronics, network PCs, servers, and the like.

In embodiments, NSs 106 and 107 are configured to receive information associated with a user and to enable the user to customize a view based in part, on the received information. In embodiments, the received information includes, but is not limited to, profile information, category information, an activity, membership information associated with a category, and the like.

In embodiments, NSs 106 and 107 further employ the received information to enable the user to customize a view associated with The Investor Network perspective based, in part, on received criteria. In embodiments, by providing customized views, the user may vary quantities of personal information publicly known about the user.

In embodiments, NSs 106, 107 also enable another user of The Investor Network, such as a user of one of client devices 102-104, to view the customized view based on the received criteria. In embodiments, NSs 106, 107 employ a web service, email service, and the like, to make the customized view available to the other investor network user, as appropriate.

In embodiments, NSs 106, 107 employ processes such as described in more detail below in conjunction with other figures to manage the customized views.

In embodiments, various systems in accordance with the present invention are constructed. FIG. 1 is a diagram illustrating an exemplary system in which exemplary embodiments of the present invention operate. In embodiments, the present invention operates, and can be embodied in, other systems as well. In embodiments, The Investor Network's architecture has a large number of members and concurrent transactions.

Figure 2:
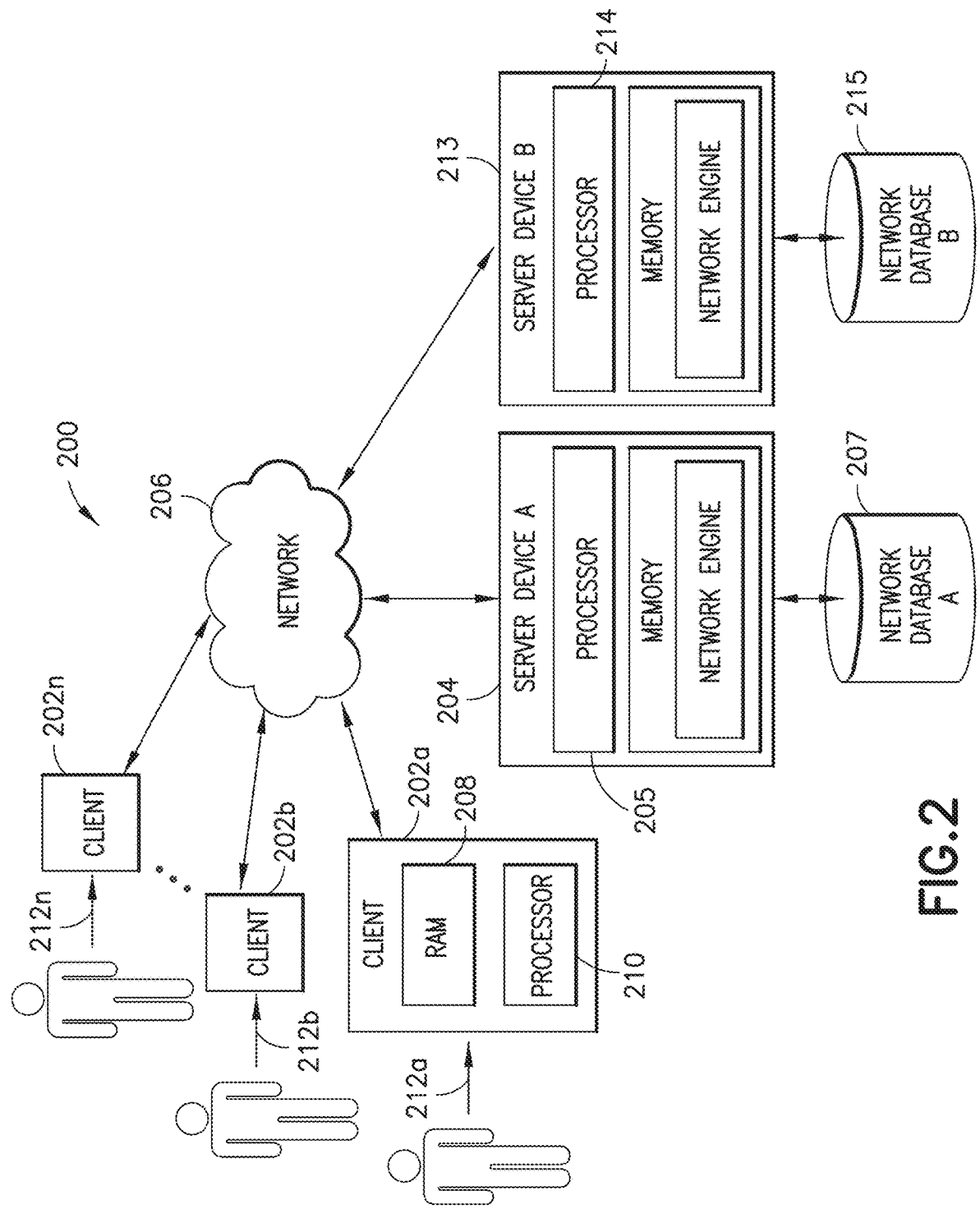
FIG. 2 illustrates another exemplary embodiment of the computer and network architecture that supports the present invention.

FIG. 2 illustrates another exemplary embodiment of the computer and network architecture that supports The Investor Network. The client devices 202*a*, 202*b* thru 202*n* shown each comprises a computer-readable medium, such as a random access memory (RAM) 208 coupled to a processor 210. The processor 210 executes computer-executable program instructions stored in memory 208. Such processors comprise a microprocessor, an ASIC, and state machines. Such processors comprise, or are be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 210 of client 202*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

In some embodiments, Client devices 202*a-n* also comprise a number of external or internal devices such as a mouse, a CD-ROM, DVD, a keyboard, a display, or other input or output devices. Examples of client devices 202*a-n* are personal computers, digital assistants, personal digital assistants, cellular phones, mobile phones, smart phones, pagers, digital tablets, laptop computers, Internet appliances, and other processor-based devices. In general, a client device 202*a* are be any type of processor-based platform that is connected to a network 206 and that interacts with one or more application programs. Client devices 202*a-n* operate on any operating system capable of supporting a browser or browser-enabled application, such as Microsoft™, Windows™, or Linux. The client devices 202*a-n* shown include, for example, personal computers executing a browser application program such as Microsoft Corporation's Internet Explorer™, Apple Computer, Inc.'s Safari™, Mozilla Firefox, and Opera.

In some embodiments, through the client devices 202a-n, users/investors 212a-n communicate over The Investor Network 206 with each other and with other systems and devices coupled to the network 206. As shown in FIG. 2, server devices 204 and 213 are also coupled to the network 206.

In other embodiments, the server devices 204, 213 shown comprises a server executing The Investor Network application program. The Investor Network application program allows users, such as user 212a, to interact with and participate in The Investor Network.

In some specific embodiments, The Investor Network can comprise any of a variety of suitable arrangements. An entity or member of The Investor Network can have a profile. In embodiments, The Investor Network facilitates interactions between member profiles and allow associations or relationships between member profiles. In embodiments, each profile represents an investor or an issuer. In embodiments, each profile contains entries, and each entry comprises information associated with a profile. Examples of entries for a person profile can comprise information regarding personal preferences, professional preference and/or investment preferences. In embodiments, entries comprise market sector, customer base, location, supplier information, net profits, net worth, number of employees, stock performance, or other types of information associated with the business profile. Additionally, entries within a profile can comprise associations with other profiles. In embodiments, associations between profiles within The Investor Network include, for example, friendships, business relationships, investment relationships, acquaintances, community associations, activity partner associations, common investor interest associations, common characteristic associations, or any other suitable type of association between profiles.

In embodiments, The Investor Network also comprises communities. In embodiments, communities within The Investor Network represent groups of members sharing common interests or characteristics about investing, a particular investment strategy, an investment product, and/or a company. Communities can comprise subcommunities, and multiple communities can be arranged into global communities. In embodiments, subcommunities can comprise groups of profiles within a larger community that share common interests or characteristics independent from the entire community.

In embodiments, similar to the client devices 202a-n, the server devices 204, 213 shown comprise processors 205, 214 coupled to computer-readable memory. In embodiments, the server devices 204, 213 are in communication with The Investor Network's databases 207, 215. In embodiments, server devices 204, 213 are implemented as a network of computer processors. Examples of a server device, such as server devices 204 and 213, are servers, mainframe computers, networked computers, a processor-based device, and similar types of systems and devices. In embodiments, client processor 210 and the server processor 205, 214 are processors from Intel Corporation of Santa Clara, Calif. and/or Motorola Corporation of Schaumburg, Ill.

In embodiments, The Investor Network implements requirements for write permissions on the web server. In embodiments, The Investor Network filters content that members publish within the community through, for example, an HTML filter that determines which HTML tags are allowed in the incoming content.

In embodiments, server devices 204, 213 also provide access to storage elements, such as a network storage element, in the example shown in FIG. 2, databases 207 and 215. The databases 207, 215 are used to store information for The Investor Network. In embodiments, data storage elements include any one or combination of methods for storing data, including without limitation, arrays, hash tables, lists, and pairs. In embodiments, other similar types of data storage devices can be accessed by the server devices 204 and 213. In embodiments, The Investor Network application program receives data comprising the members profiles from The Investor Network's databases 207 and 215 and also sends data comprising member profiles to The Investor Network databases for storage. In embodiments, The Investor Network's databases 207 and 215 are physically attached or otherwise in communication with The Investor Network application program by way of a network or other connection. In embodiments, the database platform is either Oracle or SQLServer, and the operating systems include either Windows or Unix (AIX, Solaris).

It should be noted that embodiments of the present invention comprise systems having different architecture than that which is shown in FIGS. 1 and 2. For example, in some systems according to the present invention, server device 204 comprises a single physical or logical server. The systems 100 and 200 shown in FIGS. 1 and 2 are merely exemplary, and are used to help explain The Investor Network and methods illustrated in other figures.

In embodiments, The Investor Network provides a communication vehicle for shareholders to voice concerns/questions and allows those corporations to address the top concerns on a regularly scheduled or ongoing basis. In embodiments, The Investor Network provides a vehicle for brokerage clients to engage in Web 2.0 capabilities in a secure environment. In embodiments, The Investor Network provides a capability for members of investment oriented social networks to differentiate each other and filter out irrelevant discussions. In embodiments, The Investor Network provides an information exchange whereby subscribers to the community (namely corporations and institutional investors) tap into the insight of the community to identify trends and develop strategies. In embodiments, The Investor Network charges subscription/consulting fees to issuers, professional investors and other interested parties. In embodiments, The Investor Network may include advertising. In embodiments, The Investor Network provides information to participating and non-participating brokers through it report generation capabilities, including, for example, reports regarding market segments and trends. In embodiments, The Investor Network allows issuers to sponsor, conduct, and/or participate in Shareholder Forums in compliance with SEC or other regulatory agency rules and regulations.

Figure 3:
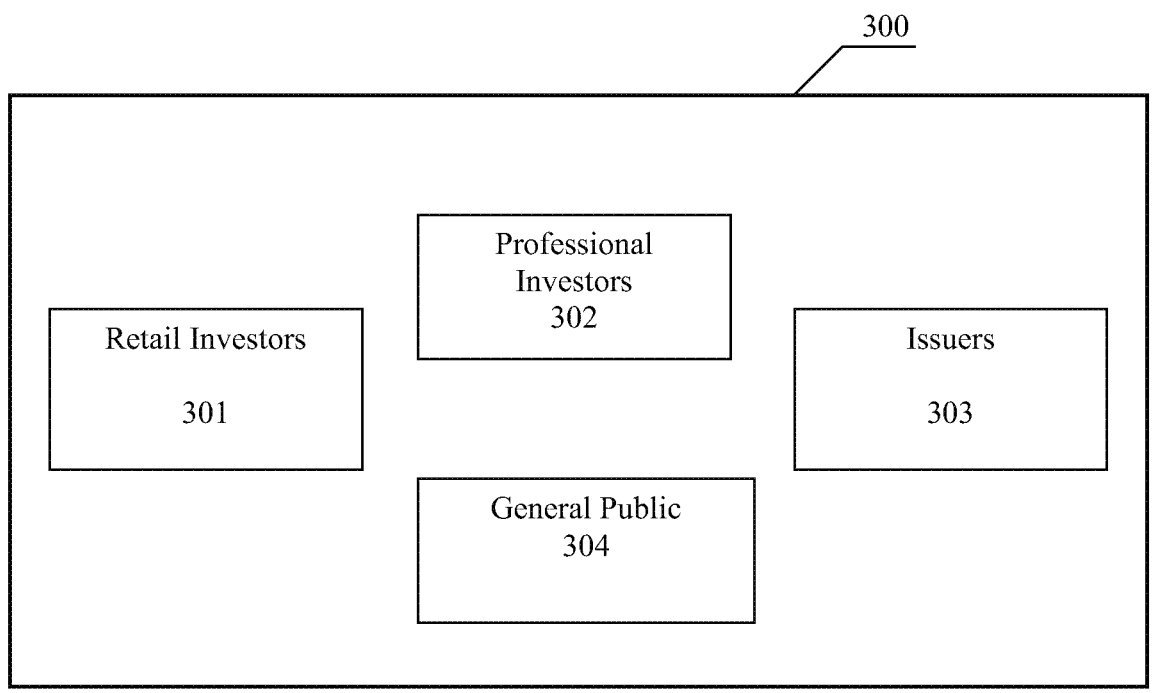
FIG. 3 illustrates a block diagram according to one embodiment of the present invention.

In embodiments, The Investor Network provides an environment in which there are four (4) primary groups: issuers, institutional investors, retail investors, and general public. The following figures and illustrative examples show how these four groups may interact within The Investor Network. However, The Investor Network is not limited to these four groups and may include any other financial market participant such as government agencies, marketers, journalists, etc. For example, FIG. 3 illustrates an embodiment of The Investor Network 300 that includes retail investors 301, professional investors 302, corporate and mutual fund issuers 303, and general public 304.

In embodiments, in The Investor Network 300, issuers 303 are enabled to establish a more direct access to their shareholders which can improve corporate governance. In embodiments, The Investor Network 300 enables one-on-one dialogue between an issuer 303 and any agreeable participating shareholder (301,302), without identifying the shareholder. In embodiments, The Investor Network 300 provides a forum for scheduled broadcast announcements to the shareholder population and gauges responses from the community. In embodiments, The Investor Network 300 is consistent with SEC's rules for Shareholder Forums. In embodiments, The Investor Network 300 provides metrics and analysis for the issuer to understand issues bubbling up from the shareholder and investor community. In some embodiments, The Investor Network 300 allows issuers 303 to perform, for example, the following activities:

read access to all forums;

post announcements to their sponsored Shareholder Forum;

respond to top voted topics on a sponsored Shareholder Forum;

create surveys/polls to shareholders.

In embodiments, The Investor Network 300 gives professional investors 302 the ability to share investment-related ideas with other professional investors 302. In embodiments, The Investor Network 300 restricts access to certain sections of The Investor Network 300 to professional investors 302 only, allowing for discussions that are more meaningful to professional investors. In embodiments, The Investor Network 300 validates, using pre-existing credentials, as discussed below, to selectively restrict access to certain sections of The Investor Network 300. In embodiments, The Investor Network 300 provides Shareholder Forums where professional investors 302 meet with corporate management. In embodiments, The Investor Network provides professional investors 302 and issuers 303 with metrics and trending information, associated with community sentiment, usage and behavioral patterns. In some embodiments, The Investor Network 300 allows professional investors 302 to perform, for example, the following activities:

read access to all forums;

write access to professional forums and general forums;

ability to post/vote on topics to be addressed by issuers in Sharehodler Forums where they hold positions; and create survey/polls.

In embodiments, The Investor Network 300 provides retail investors 301 with ability to share investment-related ideas. In embodiments, The Investor Network 300 selectively allows certain retail investors 301 to have access to view content posted by professional investors. In embodiments, The Investor Network 300 allows retail investors 301 to engage in the following typical activities, for example: reading a review on a recent analyst report, placing a comment on a company announcement, discussing economic trends with likeminded investors, etc. In embodiments, The Investor Network 300 grants retail investors 301 access rights to perform certain activities using The Investor Network's capabilities upon being validated in accordance with this invention. In embodiments, The Investor Network 300 restricts non-validated members to view-only access. In embodiments, The Investor Network 300 enables validated retail investors 301 to participate in a Shareholder Forum to discuss shareholder related items or other issues. In other specific embodiment, The Investor Network 300 may restrict the participation in a Shareholder Forum to retail investors who own shares in the company sponsoring the Shareholder Forum.

In some embodiments, The Investor Network 300 allows validated retail investors 301 to perform, for example, the following activities:

read access to all forums or certain forums that concern a company whose security they own and/or manage;

write access to general forums; and post/vote on topics to be addressed by issuer in Shareholder Forum if they are shareholders.

In embodiments, The Investor Network 300 allows general public 304 to read access to general forums.

In embodiments, The Investor Network may entitle participating brokerage firms, broker-dealers, or banks with a capability to provide their retail brokerage clients with direct access to The Investor Network, including Shareholder Forums. In embodiments, The Investor Network provides participating brokerage firms with the ability to deliver an investment oriented social networking experience to their clients via their brokerage firms' own website; thus allowing participating brokerages to maintain ownership of the relationship with their clients. In embodiments, The Investor Network has a broker-access component that aggregates information across multiple brokerage firms. In embodiments, the retail investor who accesses The Investor Network directly through its brokerage's site is not required to separately provide private information to be validated. In embodiments, he Investor Network collects information on member behavior in order to allow brokerage firms to gain insight into their client base.

In embodiments, The Investor Network includes at least three groups of participants: retail investors, professional investors, and issuers. According to some embodiments, The Investor Network provides capabilities to retail investors that allow to, for example: (1) exchange ideas with other validated investors, e.g. other retail investors and professional investors; (2) peer into conversations among professional investors to gain insight; (3) understand and comment on corporate actions taken by issuers that may affect the retail investor's investments; (4) find likeminded members/investors; (5) receive a reward or compensation for becoming an active participant; and other.

In another embodiment, The Investor Network provides capabilities to professional investors that allow professional investors to, for example: (1) build a community of peers in a trusted environment; (2) participate in issuer-sponsored Shareholder Forums (if a shareholder) (3) forecast consumer sentiment from a select and active community base; (4) gain early insight into trends/patterns affecting stock performance; and other.

In yet another embodiments, The Investor Network provides capabilities to corporations/issuers that allow issuers to, for example: (1) sponsor a Shareholder Forum; (2) establish connection to active shareholder, e.g. retail and professional investors; (3) perform real time surveys into shareholder sentiment on corporate actions; (4) find opportunities to improve customer satisfaction, increase loyalty and ensure shareholder satisfaction.

In embodiments, The Investor Network is accessed in accordance with a mechanism allowing the access through a broker based window on the broker's web site. In embodiments, The Investor Network is accessed in accordance with a mechanism allowing the access through a standalone site. FIG. 4 illustrates an embodiment of the broker based access to The Investor Network. In embodiments, when accessing The Investor Network through a broker-based window, the look and feel of the web site mimics the broker's client-side web site through the use of a customized style sheet (CSS). In embodiments, the window looks as it is a part of the brokerage's web presence and appears as a seamless extension for the brokerage client. In embodiments, as the content is generated with each click within The Investor Network, the resulting HTML is returned to the broker based application to be displayed within their page layout. In embodiments, the displayed content within the broker specific window is the aggregation of all posts among websites of participating brokers and the stand-alone site, regardless of where the member accesses The Investor Network. In embodiments, although the content is aggregated across brokers, the member profile that is displayed alongside each post does not display the identity of a broker whose web site member uses to access The Investor Network; thus providing anonymity to the retail investors and generating a positive perception of content within each individual broker site. In embodiments, The Investor Network uses IFrame software or alike to generate the look and feel of the broker's web site.

Figure 5:
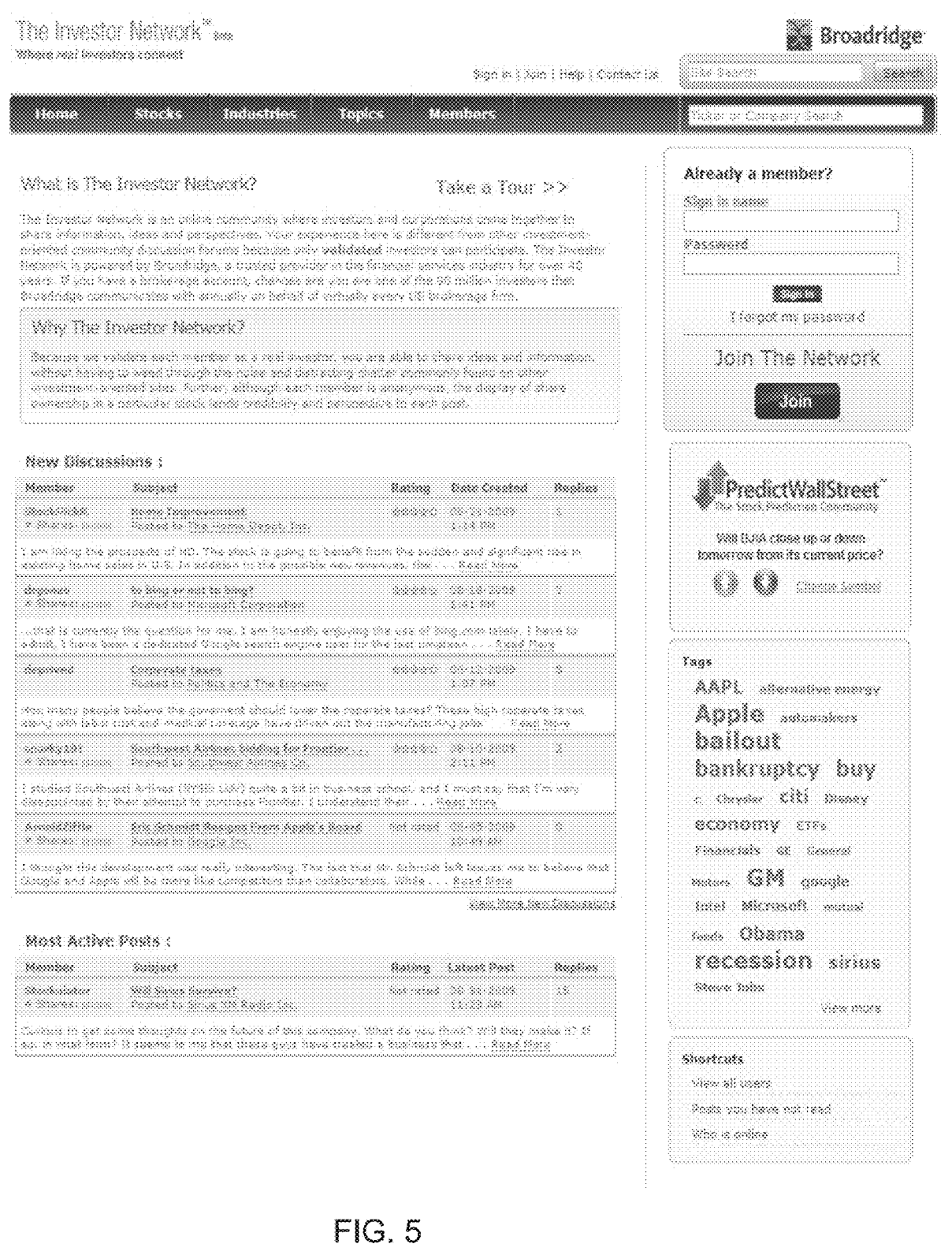
Figure 6:
FIG. 6 illustrates yet another embodiment of the present invention.

FIGS. 5 and 6 illustrate embodiments of accessing The Investor Network through a stand-alone site. In some embodiments, the experience within The Investor Network varies based on whether the member accesses The Investor Network through the broker based window or through the stand-alone site. For example, in some embodiments, for certain members who accesses The Investor Network from the stand-alone site, the access to premium content including the professional investor forums is selectively restricted. In embodiments, the stand-alone site validates retail investors when it receives information about investors' broker accounts. In embodiments, the stand-alone site may utilize the presence of advertising. In embodiments, The Investor Network measures member activity and presents metrics to third party, thus allowing third party to best optimize the placement and type of ads within The Investor Network. In embodiments, the stand-alone site provides the commoditized financial information including market overview, stock charting, financial performance, valuation ratios, etc (me-to functionality). In embodiments, the stand-alone site integrates the authentication process for professional investors and corporations.

In embodiments, The Investor Network is further customized based on how it validates the retail investors. For example, in some embodiments, once a retail investor who enters through the stand-alone site is validated, this retail investor has the same access rights as a retail investor who accesses The Investor Network through a web site of his or her broker and is allowed to access all forums, create new posts, and reply to threads on the general forums, submit comments/issues in the Shareholder Forums of the issuers in which the validated retail investor has validated positions. In embodiments, The Investor Network may restrict access to a Shareholder Forum that is sponsored by an issuer, by requiring an investor to submit a validated proxy control number or to be validated that the investor owns shares through his or her validated brokerage account. In embodiments, the validated retail investor is able to reply only to postings that are created in the general forum of The Investor Network.

Figure 7:
FIG. 7 illustrates another embodiment of the present invention.

In embodiments, issuers access The Investor Network and are allowed to view content but The Investor Network does not identify the issuers as issuers to other members until the issuers sponsor a Shareholder Forum. In other specific embodiments, issuers access The Investor Network and are allowed to view content, and being identified as issuers to other members. FIG. 7 illustrates one embodiment of an example of the Shareholder Forum. In some embodiments, The Investor Network gives an issuer an option to opt-in by creating a Shareholder Forum within its designated channel, i.e. an area of The Investor Network where a content related to the issuer is maintained. In embodiments, The Investor Network allows issuers to obtain issues/sentiments from the community, address shareholders at regularly scheduled times and provide issuers with an access to other specific features and functions. In embodiments, The Investor Network allows issuers to host a Shareholder Forum in advance of and in line with their annual shareholder meeting, other public events, or just on an ongoing basis.

In embodiments, The Investor Network allows a validated professional investor to post comments and reply to threads in the professional investor forums, access to post comments and reply to threads in general forums. In embodiments, The Investor Network allows general public, e.g. non-validated members, to access and view general content in general forums but the general public are not allowed to post or reply to posts unless they go through the process of validation. In embodiments, The Investor Network does not allow the general public to access forums involving professional investors.

In embodiments, The Investor Network validates retail investors and acquires their positional information by validating retail investors against The Investor Network's databases that store information from financial institutions participating in The Investor Network. In embodiments, when The Investor Network does not have information necessary to validate a particular retail investor, The Investor Network executes a real-time web service call to obtain the retail investor's positional information during the authentication process. In embodiments, The Investor Network executes the real-time web service call to a financial institution that has the retail investor's account(s) and either participates in The Investor Network or allows such web access to their records. In embodiments, The Investor Network then stores the retail investor's positional information in its database and uses this information when the retail investor performs certain activities within The Investor Network. In some embodiments, The Investor Network executes the real-time web service call to refresh and/or obtain the retail investor's positional information when retail investor posts content in The Investor Network.

In embodiments, when a retail investor accesses The Investor Network through the brokerage-based window, The Investor Network obtains the positional information for this retail investor from the brokerage firm or the brokerage firm's vendor at the time of the access. In embodiments, The Investor Network acquires positional information during the brokerage-based access even if this information was stored during investor's previous access. In embodiments, The Investor Network acquires positional information during the brokerage-based access when a certain time passes from when the retail investor previously accessed The Investor Network.

In embodiments, The Investor Network validates retail investors using proxy data that The Investor Network obtains from an issuer or from a participating financial institution or from a financial institution that allows The Investor Network to access its records. In embodiments, The Investor Network refreshes, re-acquires, proxy data that it maintains on a certain periodic basis. In embodiments, The Investor Network refreshes, re-acquires, proxy data that it maintains independently from when it needs that data to validate a particular retail investor. In embodiments, The Investor Network refreshes, re-acquires, proxy data that it maintains on a certain periodic basis for certain financial institutions. In embodiments, Investor Network refreshes, re-acquires, proxy data that it maintains on a certain periodic basis which depends on a particular characteristic of the proxy data. For example, in some embodiments, the periodicity with which The Investor Network refreshes the proxy data depends on whether the associate stock belongs to a particular market index, such as S&P 500, Russell 1000, or Russell 3000. For example, The Investor Network performs rolling daily refreshes of selected issuers.

In embodiments, The Investor Network refreshes, re-acquires, proxy data that it maintains based on a self-triggered maintenance and incremental refresh procedure. In embodiments, The Investor Network retrieves a full data load of proxy data (e.g. S&P 500, Russell 1000, etc) from financial institutions and then retrieves a self-triggered incremental change file on some periodic basis. The change file incorporates multiple transaction types including add/change/deletes of positional information as well acquiring account level updates including new accounts and closed accounts.

In embodiments, The Investor Network may skip validation step when retail investors access through a broker-based window. In embodiments, The Investor Network validates retail investors when they access through a stand-alone site by asking investor to select his or her broker and provide an account number. In this scenario, the member would not have to provide the login/password information, and the account number alone or in a combination with account registration information, zip code and/or other similar information is sufficient to identify the retail investor as a shareholder through available proxy data.

In embodiments, The Investor Network accesses and/or acquires retail investors' positional information from a data aggregator/consolidator, such as CashEdge, Yodlee, or Allbridge, on a certain periodic basis.

In embodiments, The Investor Network validates professional investors and issuers by inquiring its own database, accessing records of participating financial institutions and/or regulatory agencies.

In embodiments, after The Investor Network validates its investor members, both professional and retail, it generates investors' positional information when investors actively participate in The Investor Network. In embodiments, after The Investor Network validates its investor members, it generates positional information regarding a particular investment, e.g. number or range of shares owned or managed by an investor, when the investor actively engages in an activity that is related to this particular investment, such as a Shareholder Forum. In embodiments, the Investor Network displays a member's generated positional information to be observed by other members when the member actively participates in the Investor Network. In other specific embodiments, the Investor Network does not generate and/or does not display the investor's personal information when it generates or displays the member's positional information In some specific embodiments, there is a mandatory requirement that the Investor Network generates and/or displays the member's generated positional information to be observed by other members. In other specific embodiments, the Investor Network prevents a member from modifying and/or deleting the member's positional information that the Investor Network generates and/or displays for the member.

Figure 8:
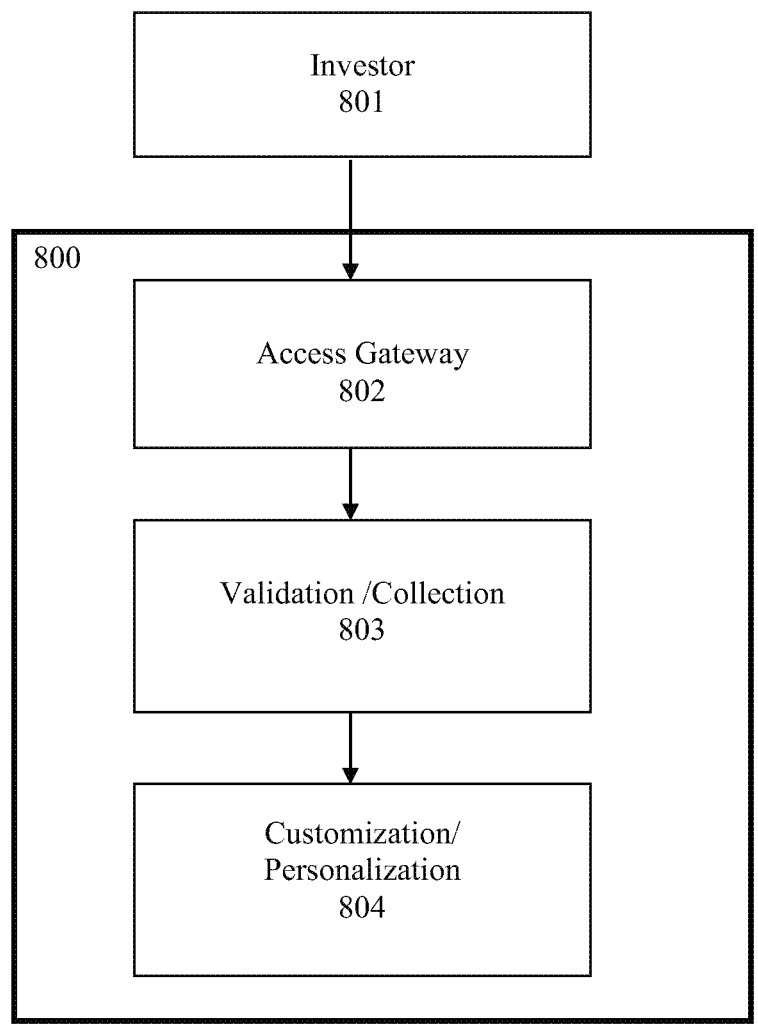
FIG. 8 illustrates a block diagram in accordance with yet another embodiment of the present invention.

FIG. 8 shows a functional block diagram illustrating one embodiment of the present invention. According to this embodiment, an investor accesses The Investor Network 800 through an access gateway 802 that identifies whether the investor 801 accesses from a web site of a participating financial institution or through The Investor Network's stand-alone site. In embodiments, using the access gateway 802, The Investor Network allows its members and prospective members to access the network's content through a single sign-on mechanism. A validation/collection block 803 performs the validation and the collection of the positional information. In some embodiments, the validation/collection block 803 also collects and receives from external sources additional information such as, for example, news, proxy data, reports, market data, etc. After The Investor Network validates and/or identifies an investor as belonging to a particular member category, for example, validated retail investor, non-validated retail investor, general public, issuer, professional investor, etc.,—a customization/personalization block 804 formats The Investor Network's content that is available to or is permitted to access by this member category. In the embodiment, the customization/personalization block 804 formats the displayed content based on any personal preferences that the member expressed during the past visits or based on the information that The Investor Network collected about the member's past activities in The Investor Network.

In embodiments, the customization/personalization block 804 formats content based on, for example, at least one of the following permissions:
 (a) view permissions—controlling the ability to see a forum
 (b) read permissions—controlling the ability to read posts within a forum,
 (c) post permissions—controlling the ability to post new message in the forum,
 (d) reply permissions—controlling the ability to reply to existing messages,
 (e) vote permissions—controlling the ability to vote in polls,
 (f) attachment permissions—allowing members to embed text attachments and videos,
 (g) create poll permissions—enabling members to participate in question & answer sessions,
 (h) permissions to mark posts as "answers",
 (i) sticky permissions to enable posts to be configured so they stay on top of all other posts for a duration of time, and
 (j) announce permissions that enable a post to be marked as an announcement for posting information about the forum that all members should read Continue with FIG. 8, a content presentation/participation block 804 generates displays content and controls a level of participation allowed to this particular member category, e.g. view-only or post and reply to postings, etc. In embodiments, the content presentation/participation block 804 also generates an investor's positional information when the investor actively participates in The Investor Network. In embodiments, the content presentation/participation block 804 displays the generated positional information to be observed by other members. In some specific embodiments, there is a mandatory requirement that the content presentation/participation block 804 generates and/or displays the member's positional information.

In some other specific embodiments, the content presentation/participation block 804 does not generate and/or does not display the member's personal information when it generate and/or displays the member's positional information. In another specific embodiments, the content presentation/participation block 804 prevents a member from modifying and/or deleting the member's positional information that is generated and/or displayed by the content presentation/participation block 804.

Figure 9:
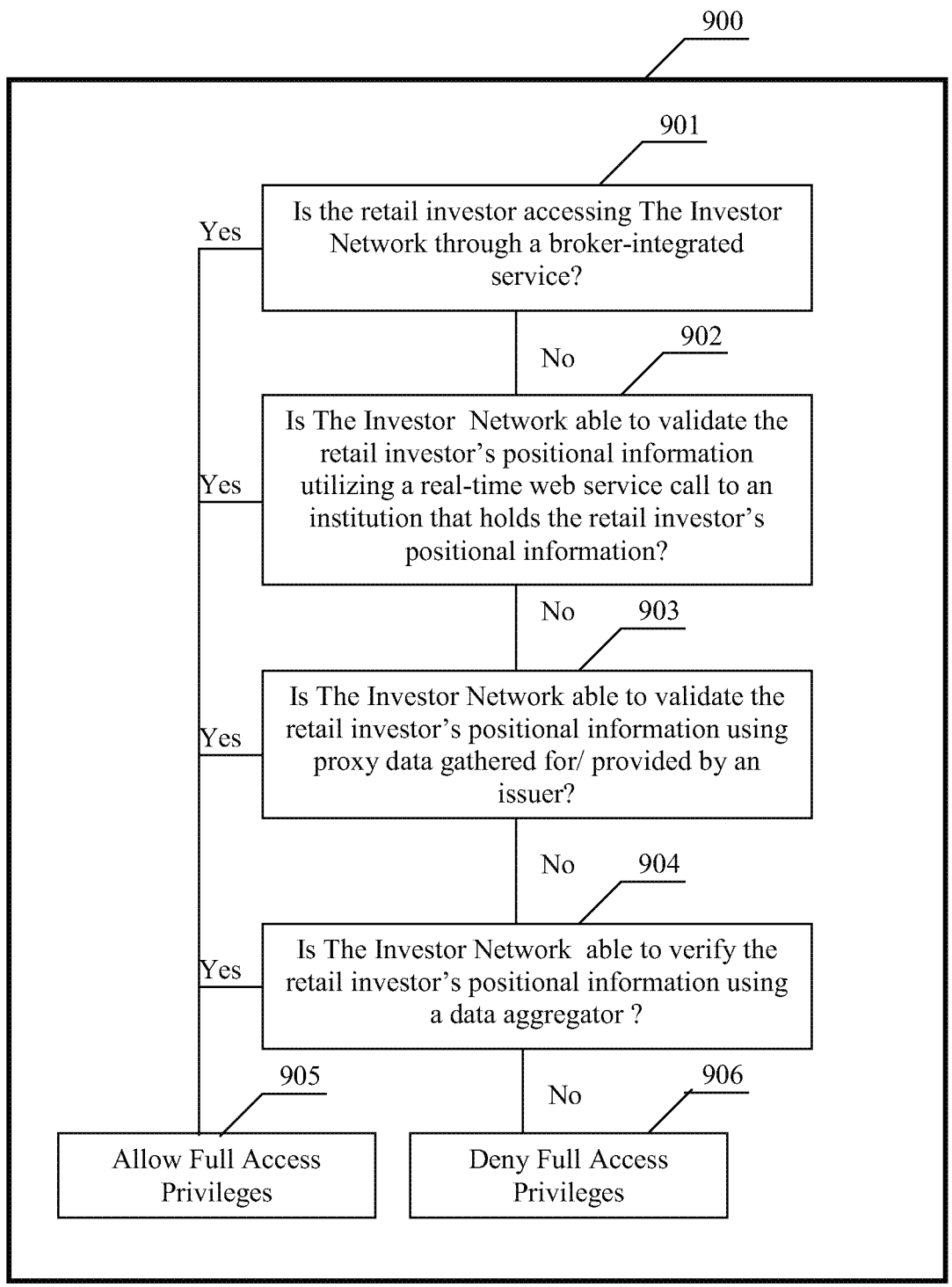
FIG. 9 illustrates a block diagram in accordance with yet another embodiment of the present invention.

FIG. 9 is a block diagram illustrating one embodiment of the validation process performed by The Investor Network through a single screen sign-on process when an investor accesses The Investor Network through a stand-alone website. The Investor Network 900 first identifies in a step 901 whether the retail investor accesses The Investor Network through a broker-integrated service. If the answer is no, then The Investor Network next identifies in a step 902 whether The Investor Network is able to validate the retail investor's positional information utilizing a real-time web service call to an institution that holds the retail investor's positional information. If the answer is no, then The Investor Network next identifies in a step 903 whether The Investor Network is able to validate the investor's positional information using proxy data gathered for or provided by an issuer. If the answer is no, then The Investor Network next identifies in a step 904 if The Investor Network is able to verify the retail investor's positional information using a data aggregator. If the answer is yes to any of the preceding questions, the retail investor is deemed to be validated and The Investor Network grants full access privileges in a step 905 to this validated retail investor. In contrast, if the answer is still no in the step 904, then The Investor Network denies full access privileges and considers such retail investor to be a member of general public.

Figure 10:
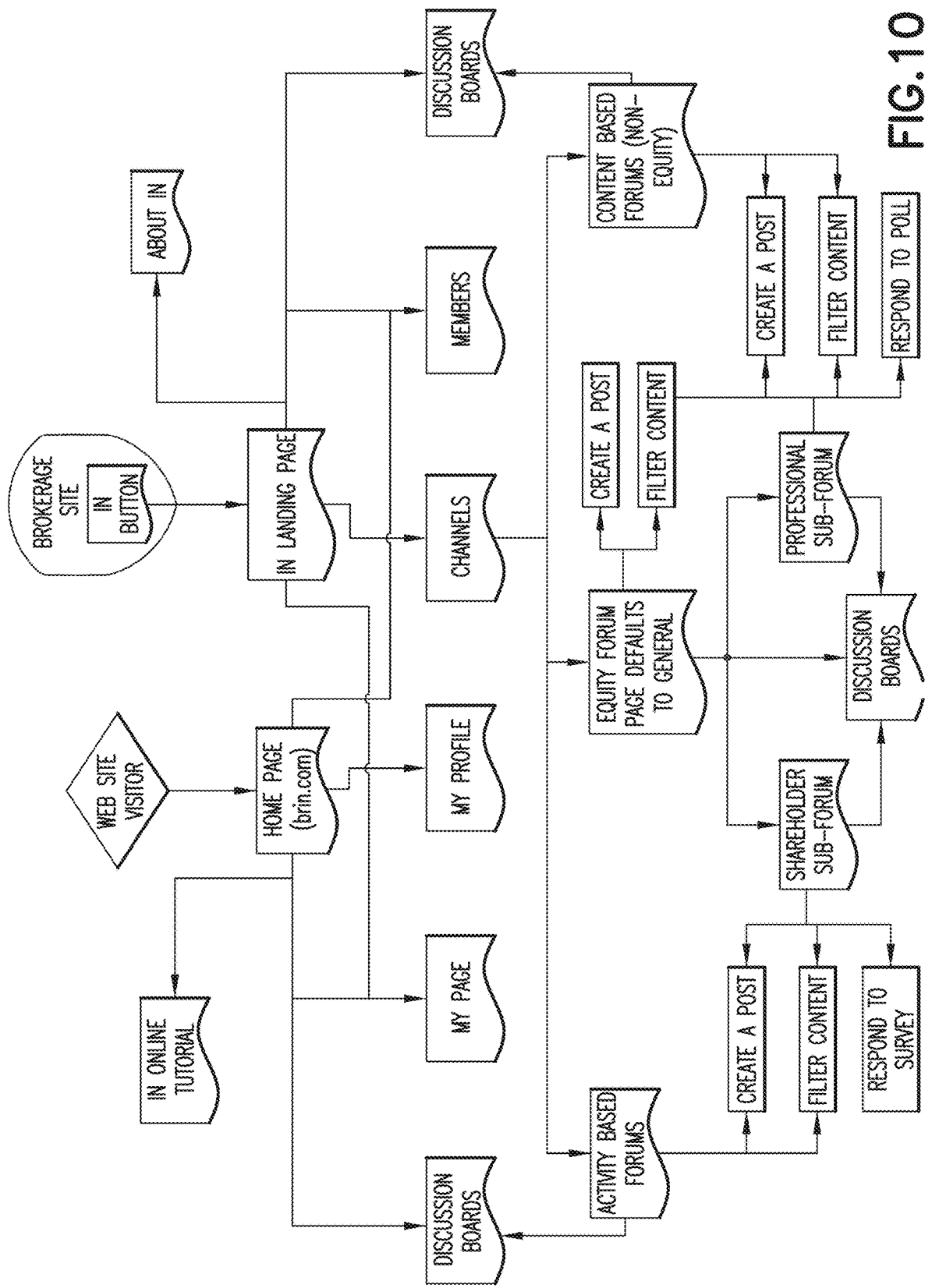
FIG. 10 illustrates a block diagram in accordance with another embodiment of the present invention.

FIG. 10 is a block diagram illustrating an embodiment of an architecture of the investment network in accordance with the present invention.

Figure 11:
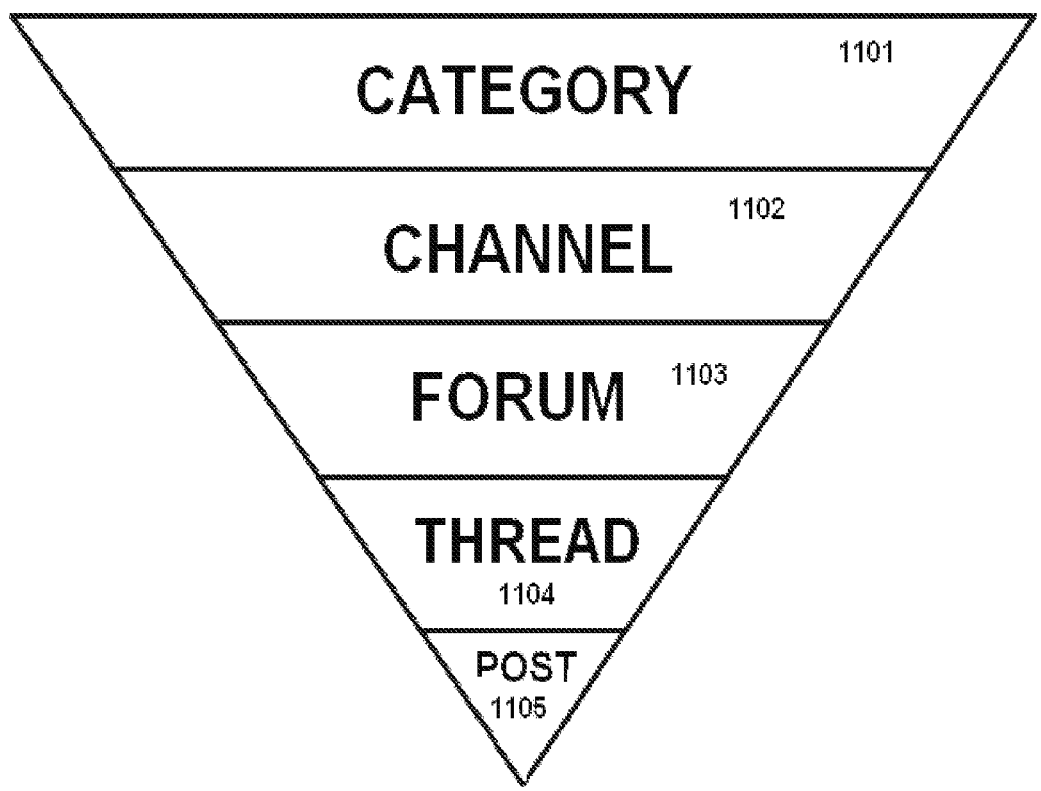
FIG. 11 illustrates a diagram in accordance with another embodiment of the present invention.

FIG. 11 is a diagram illustrating an embodiment of a content organization in The Investor Network in accordance with the invention. In embodiments, the functional make-up of The Investor Network consists of a discussion board, social media functionality, channels, shareholder and professional investor sub-forums, and education/demonstration on using the system. In embodiments, The Investor Network ensures that the user generated content is readily accessible and provides a source for members to easily research investment ideas by organizing the forums into categories 1101 (e.g. Equities, Indexes, Macroeconomic Trends, Industries, etc.) which can be further broken down into content based channels 1102 (e.g. Microsoft, Nasdaq, Politics, Software, etc.). In embodiments, within each of these classifications, e.g. categories 1101 and channels 1102, The Investor Network provides forums or discussion boards 1103. In embodiments, different forums are available to the general community, includes both retail and professional investors, and to members of the professional investor community. In embodiments, the same forums are available to the general community and to members of the professional investor community. In embodiments, forums are established to create micro-communities for investors care for specific issues, for example, investors that view investing as gaming.

In embodiments, within each specific forum, members are able to type in posts 1105 as well as upload media specific content such as video, audio and images. In embodiments, members are able to reply to specific post, and threads 1104 are designated as specific posts and all the resulting replies.

In embodiments, activity based content is be organized into control panels, such as selection controls, that are placed within pages of The Investor Network. In embodiments, the control panels, such as selection controls, are member configurable from a selection of activity based items. For example, in embodiments, the set of activity based items includes:

Most Recently Added Post;
Top Ranked Post;
Most Viewed Posts; and
Most Replied to Post.

In embodiments, by clicking on any of these items, members are directed to an activity page that shows the top 10 items in sequential fashion (e.g. if the member selects the most recently added post, they will see the 10 most recently added posts with the one they selected on top). In embodiments, the initial display of postings is controlled by the content presentation/participation block 804 in FIG. 8. In embodiments, the view can also contain the ability to expand a commented post and display the actual threaded discussion.

In embodiments, categories 1101, channels 1102 and forums 1103 are designed or generated through the interests of the community. For example, in some embodiments, the content channels 1102 include a channel for a specific investment holding (e.g., MSFT, GE, etc) or a specific macroeconomic trend (Politics, Oil Price, etc.). In embodiments, the content based channels 1101 and categories 1102 are dynamically created based on the collective interests of the community. In embodiments, only validated members are able to post or reply to comments. In embodiments, The Investor Network provides its members with an extensive profile management capability that includes custom items beyond positional information.

In embodiments, The Investor Network provides a capability for validated members to personalize their experience by, for example, maintaining a list of their favorite forums and/or members. In embodiments, The Investor Network provides its members with a capability to recommend posts. In embodiments, The Investor Network provides a rating for members who generate the posts. In embodiments, the rankings are used as a mechanism for the community to acknowledge who is providing valuable information. In embodiments, The Investor Network employs a search method that delivers posts of members with higher ranking more often, or at the top of the search result page, and includes other ways to differentiate posts of members with higher ranking.

In embodiments, The Investor Network provides syndication by allowing members of The Investor Network to select posts, members, and eventually content to be sent to a RSS (really simple syndication) reader. In embodiments, The Investor Network provides a capability to send search results, active discussions, unanswered questions, individual forums, and individual threads to members when they become available on The Investor Network system. In embodiments, The Investor Network provides a capability to read, reply, and post comments through email and a capability to mass-email a groups of members within the community. In embodiments, The Investor Network allows members to store, organize, manage and search a repository of posts important to them. In embodiments, The Investor Network provides a capability to a member to setup a folder within his or her 'MyPage' and place links to particular posts within that folder.

In embodiments, The Investor Network provides a self policing feature that allows members to report posts that are objectionable. In embodiments, The Investor Network provides comprehensive searching and filtering capabilities by making all forum content to be searchable. In embodiments, the search results are only returned from the forums where the member running the search has permissions to read/view the content. In embodiments, The Investor Network utilizes search tools that have a capability to only search specific forums as well as members. In embodiments, The Investor Network utilizes a search weighting algorithm to control how results are returned based on how content should be available to be configured. For example, in embodiments, number of views, comments, ratings, etc, could be configured to control the order of the results. In embodiments, The Investor Network provides a capability to filter posts based on a set of customizable filters (e.g. position level, type of investor, ranking). In embodiments, The Investor Network utilizes semantic search and fuzzy logic to improve accuracy in finding content for its members In embodiments, The Investor Network provides a reporting capability on basic usage statistics. In embodiments, The Investor Network provides detailed analysis of forum threads, tracking answered/unanswered questions, and provides analytics and trending on how people are contributing content within the community. In embodiments, The Investor Network uses data on investor insights and trends as a premium service. In embodiments, The Investor Network stores history for all actions and/or activities that take place within The Investor Network. In embodiments, The Investor Network supports and/or incorporates plug-ins and a $3^{rd}$ party reporting tools, such as Crystal Reports, Web Trends, and Google Analytics.

In embodiments, a discussion board provides features that, for example, include:
- Ability to show standard and threaded discussions,
- quick list of posts the member has recently participated in,
- active posts,
- unanswered posts,
- paging,
- quoting, favorites,
- WYSIWYG editors,
- polls and voting,
- unlimited forums and categories,
- sticky topics and announcements, and
- private messaging system.

In embodiments, The Investor Network provides a capability to include attachments in individual posts. In embodiments, The Investor Network provides a capability to a "community manager" to control and determine what types of attachments to allow, for example based on extension type. In embodiments, attachments, for example, include photos that can be embedded within the forum posts as attachments, images stored in a separate photo gallery, or as remote file stored on another server. In embodiments, attachments in form of videos can also be embedded in forum posts. In embodiments, The Investor Network provides a capability to search with the attachments as a requirement.

In embodiments, The Investor Network provides a capability to do content mirroring, which is a mechanism that allows members to subscribe to other RSS. In embodiments, The Investor Network provides the "community moderators" with capabilities for managing content, such as abilities to move and delete content. In embodiments, The Investor Network provides SPAM, unsolicited bulk messages sent indiscriminately, scoring to automatically detect and evaluate possible SPAM content. In embodiments, The Investor Network provides its members with a capability to associate tag(s) with posting(s). In embodiments, The Investor Network automatically tags content based on the content type (image, audio, and video). In embodiments, The Investor Network provides a capability to its members to search its content based on the associated tag (e.g. Economic Crisis, Primaries, Oil Price, etc.), thus allowing its members to find faster their content when conducting a search for a particular keyword. In embodiments, The Investor Network automatically highlights tags so that the member has the capability to select suggested tags. In embodiments, The Investor Network provides tag clouds that provide its members an idea of relative strength on the prevalence and context of common keywords.

In one embodiment of the invention, the investment social network allows only its validated members to submit content to The Investor Network. In one embodiment of the invention, the validated shareholders are provided with an ability to voice concerns/questions to issuers. In one embodiment of the invention, issuers, e.g. corporations, are provided with ability to address the voiced concerns. In one embodiment of the invention, issuers, e.g. corporations, are provided with ability to communicate directly with agreeable investors, who anonymously participate in these communications with issuers. In one embodiment of the invention, The Investor Network provides a secure, trustful environment for interactions between its members.

In one embodiment of the invention, The Investor Network provides an ability to analyze and/or data mine the content and other data generated by members and/or collected by The Investor Network. In one embodiment of the invention, The Investor Network is operated in accordance with SEC rules and other government regulations regarding electronic communications interactions concerning investment activities.

In one embodiment of the invention, The Investor Network provides a governmental agency with an ability to conduct audit activities within The Investor Network. In one embodiment of the invention, The Investor Network provides an issuer with a capability to hold and/or broadcast discussions, webinars, etc. which are restricted only to its shareholders. In one embodiment of the invention, the validated investors are given capabilities to perform certain activities, such as reading a review on a recent analyst report, placing a comment on a company announcement, discussing economic trends with likeminded investors. In one embodiment of the invention, certain validated retail investors are allowed to view content posted by professional/institutional investors. In one embodiment of the invention, The Investor Network aggregates retail and professional investors' information among numerous financial institutions.

In one embodiment of the invention, The Investor Network issues pre-existing credentials to investors who access The Investor Network through a website of a financial institution that is integrated with The Investor Network. In one embodiment of the invention, The Investor Network provides the validated investors with a capability to filter content based on numerous criteria. In one embodiment of the invention, The Investor Network customizes and personalizes its appearance for a particular investor based on this investor's positional information.

In one embodiment of the invention, The Investor Network allows issuers and/or financial institutions to target a specific group of retail and/or professional investors. In one embodiment of the invention, The Investor Network continuously updates its members' positional information In one embodiment of the invention, The Investor Network differentiates entitlements to certain capabilities based on the visitor's status and/or the visitor's classification as belonging to a particular type of financial market participants (e.g. retail investor, professional/institutional investor, issuers, etc.). In one embodiment of the invention, The Investor Network allows a network manager to configure capabilities and permissions that govern visitors' behavior in The Investor Network. In one embodiment of the invention, The Investor Network tracks activities of each visitor.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may have been described herein as being "computer implementable" or "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further still, the various steps may be carried out in any desired order (and any desired steps may be added and/or any desired steps may be eliminated).

What is claimed:

1. A method comprising:
   receiving, by a processor, an identifying data concerning an ownership or management of at least one brokerage account or at least one security by at least one user;
   wherein the identifying data of the at least one user comprises a proxy control number associated with the at least one user and an investor type identifier of the at least one user;
   obtaining, by the processor, based on the identifying data, positional information associated with the at least one user;
   validating, by the processor, the at least one user as at least one permissioned user based at least in part on the positional information associated with the at least one user;
   providing, by the processor and over a computer network, to the at least one permissioned user, a permissioned access on a computing device associated with the permissioned user to a network platform hosting a shareholder forum and a presentation of a shareholder meeting;
   generating, by a processor, within the network platform, a representation of the positional information associated with the at least one permissioned user without providing a personal identifying information of the at least one permissioned user so that to allow at least one other user, accessing the network platform, to observe the representation of the positional information of the at least one permissioned user that remains anonymous;
   permitting, by the processor, the at least one permissioned user to perform at least one activity within the network platform based at least in part on the positional information of the at least one permissioned user, the investor type identifier of the at least one permissioned user, or both; and
   wherein the at least one activity is at least one of i) interacting with the at least one other user within the network platform and ii) accessing a particular content within the network platform.

2. The method of claim 1, wherein the at least one security is associated with an issuer who hosts the shareholder meeting.

3. The method of claim 1, further comprising:
   generating and storing, by the processor, a record of activities of the at least one permissioned user in the shareholder forum to form an auditable user activities record.

4. The method of claim 1, wherein the shareholder meeting is an annual meeting.

5. The method of claim 1, further comprising:
   permitting, by the processor, the at least one permissioned user to access, on the computing device associated with the at least one permissioned user, the shareholder forum prior to a start of the presentation of the shareholder meeting.

6. The method of claim 1, further comprising:
   permitting, by the processor, the at least one permissioned user to access, on the computing device associated with the at least one permissioned user, the shareholder forum after to the presentation of the shareholder meeting has ended.

7. The method of claim 1, further comprising:
   preventing, by the processor, the at least one permissioned user from altering or deleting the representation of the positional information within the network platform.

8. The method of claim 1, further comprising:
   permitting, by the processor, a sponsoring issuer to originate, within the network platform, the shareholder forum.

9. A system comprising:
   a non-transitory computer memory storing computer-executable program instructions; and
   at least one processor configured to at least:
   receive identifying data concerning an ownership or management of at least one brokerage account or at least one security by at least one user, wherein the identifying data of the at least one user comprises a proxy control number associated with the at least one user and an investor type identifier of the at least one user;
   obtain, based on the identifying data, positional information associated with the at least one user;
   validate the at least one user as at least one permissioned user based at least in part on the positional information associated with the at least one user;
   provide, over a computer network, to the permissioned user, a permissioned access on a computing device associated with the permissioned user to a network platform hosting a shareholder forum and a presentation of a shareholder meeting;
   generate, within the network platform, a representation of the positional information associated with the at least one permissioned user without providing personal identifying information of the at least one permissioned user so that to allow at least one other user, accessing the network platform, to observe the representation of the positional information of the at least one permissioned user that remains anonymous;
   permit the at least one permissioned user to perform at least one activity within the network platform based at least in part on the positional information of the at least one permissioned user, the investor type identifier of the at least one permissioned user, or both; and wherein the at least one activity is at least one of i) interacting with the at least one other user within the network platform and ii) accessing a particular content within the network platform.

10. The system of claim 9, wherein the at least one security is associated with an issuer who hosts the shareholder meeting.

11. The system of claim 9, wherein the at least one processor is further configured to generate and store a record of activities of the at least one permissioned user in the shareholder forum to form an auditable user activities record.

12. The system of claim 9, wherein the shareholder meeting is an annual meeting.

13. The system of claim 9, wherein the at least one processor is further configured to permit the at least one permissioned user to access, on the computing device associated with the at least one permissioned user, the shareholder forum prior to a start of the presentation of the shareholder meeting.

14. The system of claim 9, wherein the at least one processor is further configured to permit the at least one permissioned user to access, on the computing device associated with the at least one permissioned user, the shareholder forum after to the presentation of the shareholder meeting has ended.

15. The system of claim 9, wherein the at least one processor is further configured to prevent the at least one permissioned user from altering or deleting the representation of the positional information within the network platform.

16. The system of claim 9, wherein the at least one processor is further configured to permit a sponsoring issuer to originate, within the network platform, the shareholder forum.

\* \* \* \* \*